United States Patent
Paz de Araujo et al.

(10) Patent No.: US 6,174,213 B1
(45) Date of Patent: Jan. 16, 2001

(54) FLUORESCENT LAMP AND METHOD OF MANUFACTURING SAME

(75) Inventors: Carlos A. Paz de Araujo; Jolanta Celinska; Joseph D. Cuchiaro; Jeffrey W. Bacon; Larry D. McMillan; Akihiro Matsuda, all of Colorado Springs, CO (US); Gota Kano, Kyoto (JP); Yoshio Yamaguchi, Osaka (JP); Tatsuo Morita, Kyoto (JP); Hideo Nagai, Osaka (JP)

(73) Assignees: Symetrix Corporation, Colorado Springs, CO (US); Matsushita Electronics Corporation (JP)

(*) Notice: Under 35 U.S.C. 154(b), the term of this patent shall be extended for 0 days.

(21) Appl. No.: 09/388,038

(22) Filed: Sep. 1, 1999

(51) Int. Cl.[7] .............................. B05D 7/22; B05D 5/12; C03C 17/245; C03C 17/25
(52) U.S. Cl. .............................. 445/58; 427/67; 427/106; 313/489
(58) Field of Search ................................ 445/58; 427/67, 427/106; 313/489

(56) References Cited

U.S. PATENT DOCUMENTS

| | | |
|---|---|---|
| 3,067,356 | 12/1962 | Ray . |
| 3,377,494 | * 4/1968 | Repsher ............................. 313/489 |
| 3,544,828 | * 12/1970 | Bouchard et al. .................. 313/489 |
| 3,624,444 | * 11/1971 | Berthold et al. ................... 313/489 |
| 3,967,153 | 6/1976 | Milke et al. . |
| 4,289,991 | * 9/1981 | Schreurs ........................... 313/489 |
| 4,293,594 | * 10/1981 | Yoldas et al. ...................... 427/67 |
| 4,338,544 | 7/1982 | Komiya et al. . |
| 4,363,998 | 12/1982 | Graff et al. . |
| 4,859,036 | 8/1989 | Yamanaka et al. . |
| 5,131,065 | 7/1992 | Briggs et al. . |
| 5,164,799 | 11/1992 | Uno . |
| 5,338,951 | 8/1994 | Argos, Jr. et al. . |
| 5,384,517 | 1/1995 | Uno . |
| 5,539,277 | 7/1996 | Jansma . |
| 5,559,260 | 9/1996 | Scott et al. . |
| 5,560,958 | * 10/1996 | Duzyk et al. ....................... 427/67 |
| 5,619,096 | 4/1997 | Kaliszewski et al. . |
| 5,634,835 | 6/1997 | Wu et al. . |

FOREIGN PATENT DOCUMENTS

| | | |
|---|---|---|
| 5-28969 | 2/1993 | (JP) . |
| 219-92211 | 4/1997 | (JP) . |

OTHER PUBLICATIONS

Weber et al., "Materials and Manufacturing Issues for Color Plasma Displays," MRS Bulletin, p. 65–68 (Mar. 1996).

* cited by examiner

Primary Examiner—Kenneth J. Ramsey
(74) Attorney, Agent, or Firm—Duft, Graziano & Forest, P.C.

(57) ABSTRACT

Metal organic precursor compounds are dissolved in an organic solvent to form a nonaqueous liquid precursor. The liquid precursor is applied to the inner envelope surface of a fluorescent lamp and heated to form a metal oxide thin film layer. The metal oxide thin film layer may be a conductor, a protective layer or provide other functions. The films have a thickness of from 20 nm to 500 nm. A conductive layer comprising tin-antimony oxide with niobium dopant may be fabricated to have a differential resistivity profile by selecting a combination of precursor composition and annealing temperatures.

92 Claims, 3 Drawing Sheets

FLUORESCENT LAMP AND METHOD OF MANUFACTURING SAME

BACKGROUND OF THE INVENTION

1. Field of the Invention

This invention relates fluorescent lamps, and more particularly to methods of manufacturing a fluorescent lamp having metal oxide thin film layers on the inner surface of the fluorescent lamp wall.

2. Statement of the Problem

A typical fluorescent lamp comprises a cylindrical glass tube or envelope containing mercury vapor and a phosphor layer covering the inside of the tube wall. Many fluorescent lamps, in particular rapid-start fluorescent lamps, usually comprise one or more metal oxide layers; for example, an electrically conductive metal oxide layer on the inner surface of the glass tube, and a metal oxide protective layer between the conductive layer and the phosphor layer of the lamp. A conventional technique of the art of forming metal oxide layers in fluorescent lamps involves: dispersing a solid powder of the desired oxide in a liquid medium to make a colloidal suspension of the oxide; applying a coating of the suspension onto a surface of the lamp; and drying the coating to form the oxide layer. Generally, it is difficult to achieve a uniform, continuous thin film by applying a colloidal suspension of powdered particles. Another technique involves dissolving a precursor compound in a solvent and spraying the precursor solution onto a hot surface having a temperature above the crystallization temperature of the desired oxide, whereby the precursor compound is immediately pyrolyzed. A typical conventional precursor for a conductive layer contains tin tetrachloride, $SnCl_4$, and hydrogen fluoride, HF. The chlorine and fluorine are highly electronegative, salt-forming atoms that may lead to lamp defects called "measles", as described below. Further, highly reactive precursor compounds such as $SnCl_4$ and HF are toxic and difficult to handle, and do not store well. A typical conventional precursor for a protective layer is a metal alkyl compound in a solvent. It is generally difficult to form a uniform, continuous metal oxide thin film by the conventional pyrolysis method of the prior art because pyrolysis of the sprayed precursor compound on the hot substrate results in a broken, uneven surface on the microscopic level.

Fluorescent lamps are subject to the formation of localized defects called "black spot patches" or "measles". A conductive layer is usually located between the inner surface of the glass tube wall and the phosphor layer. The conductive layer is a conductive metal oxide, such as tin oxide or indium oxide. The conductive layer serves to reduce the voltage necessary for ignition of a fluorescent lamp. Measles are believed to develop during lamp operation as a result of an interaction involving the conductive layer and the mercury in the arc discharge. The mercury is presumed to penetrate the phosphor layer, leading to conditions that allow build-up of charge and subsequent discharge, which result in the measle defect by disrupting the phosphor layer and generally forming a small crater in the glass tube. In particular, the formation of measles is believed to be caused by the presence of salts in the conductive layer. The conductive layer, also called the "nesa", is conventionally prepared by spraying a chlorine-based liquid precursor, such as tin tetrachloride and HF in butanol, onto the inside wall of the glass tube envelope and pyrolizing the precursor to form the conductive layer on the inside surface of the glass tube. Due to the presence of chlorine or other electronegative atoms, the precursor reacts with sodium in the glass, forming salts. The salts act as holes on the surface of the conductive oxide layer and become starting points of arc discharge during operation of the fluorescent lamp. The dark arc spots, or measles, become destructive holes in the phosphor layer that shorten tube life. It is also known in the art to add small amounts of electronegative dopants, such as fluorine, to the conductive layer to increase its conductivity. This results in formation of the salts and measles.

It is known in the art to employ a protective layer of aluminum oxide, often called alumina, or certain other metal oxides, such oxides of cerium, yttrium, titanium, and zirconium to inhibit or delay discoloration and other appearance defects in the phosphor layer or the conductive oxide layer. Silicon oxide, often referred to as silica may also be included in a protective layer. These barrier layers of the prior art are located between the conductive oxide layer and the phosphor layer. The advantages of the protective coating are probably a result of the relatively nonporous metal oxide coating that protects the conductive oxide layer from ion bombardment resulting from arc discharge. Even though the phosphor layer overlies the conductive oxide layer, and is much thicker than the protective layer, it does not protect the conductive oxide layer. This is probably because the phosphor layer is more porous and less electrically insulating than the metal oxide protective layer. Nevertheless, such protective layers of metal oxides have not effectively prevented or reduced the occurrence of measle defects. Furthermore, the protective layer is generally formed utilizing aqueous colloidal suspensions or dispersion of the metal oxide in a liquid. As indicated above, it is difficult to deposit a continuous solid layer using a colloidal suspension or dispersion. Also, adding a protective layer between the conductive oxide layer and the phosphor layer necessarily increases the complexity and expense of manufacturing.

It is also known in the prior art to vary the resistivity of the conductive oxide layer to reduce the occurrence of measles. Typically, the resistivity in the conductive layer is designed to have a U-shaped profile, in which the resistance is high at the two ends of the glass tube, and low towards the center of the tube. The low resistance portion allows the flourescent lamp to obtain the benefits of a rapid-start, energy efficient lamp, while the high resistance in the end portions reduces the problem of measle defects. Typically, the low resistance portion near the center of the tube has a resistivity of about 10 k$\Omega$/square; the end portions typically have a resistivity in the range of 100–150 k$\Omega$/square. Conventionally, the U-shaped resistance profile is achieved during manufacture of the lamp by making the conductive oxide coating thicker at the ends of the lamp than at the middle. But the relative differences in electrical resistivity of conductive coatings produced in such a manner tend to decrease after about the first 500 hours of operation. Therefore, the occurrence of measle defects in lamps having varied thickness of the conductive oxide is merely delayed from a time following the first 1000 hours of operation to a later time after about 3000 to 4000 hours of operation. This is a short improvement in the total potential life of a fluorescent lamp, which is on the order of about 20,000 hours. Further, the extra process steps required to make a conductive layer having varying thicknesses along its axial length are complex and the results are not reproduced reliably.

SOLUTION

The present invention provides a novel method of forming a metal oxide thin film layer in a fluorescent lamp using a nonaqueous metal organic liquid precursor solution ("liquid precursor"). The invention provides a liquid precursor and method for forming an electrically conductive metal oxide thin film layer ("conductive layer"). The invention also provides a method of forming a conductive layer comprising a conductive metal oxide having a differential resistance profile. The invention also provides a new composition of a conductive layer containing principally tin oxide. The invention further provides method for forming an electrically nonconductive metal oxide protective layer ("protective layer") between the phosphor layer and the conductive layer of a fluorescent lamp. The inventive methods may be used to fabricate fluorescent lamps having a wide variety of metal oxide thin film layers.

A rapid-start fluorescent lamp fabricated in accordance with the invention comprises a light-transmitting lamp envelope, typically an elongated glass tube, having an interior space and an electrode at each of two ends. The lamp has a lamp wall and an inner lamp wall surface, contiguous to the interior space. The lamp envelope has an envelope wall, which has an inner envelope surface. In the case of a glass envelope, the envelope wall is a glass wall, and the inner envelope surface is an inner glass surface. In accordance with the method of the invention, a metal oxide thin film layer is formed on the inner lamp wall surface, becoming a part of the lamp wall. According to the invention, the metal oxide thin film layer may be formed on the inner envelope surface, before other layers have been formed, or it may be formed on an inner lamp wall surface of a wall that comprises the envelope wall and at least one layer of material at the time of forming the oxide layer.

Typically, a transparent conductive layer is formed on the inner envelope surface of a lamp envelope in accordance with the invention, and then a transparent protective layer is deposited on the conductive layer before formation of the phosphor layer. But a fluorescent lamp may be fabricated in accordance with the invention without a protective layer; also, other layers may be deposited either above or below the conductive layer.

The method of the invention involves applying a non-aqueous metal organic liquid precursor solution ("liquid precursor") to the inner lamp wall surface. The liquid precursor contains one or more metal organic precursor compounds that lead to formation of the desired metal oxide thin film layer upon reaction and crystallization on the lamp wall surface. Usually the desired oxide is a metal oxide; therefore, the liquid precursor usually contains a metal organic compound. The oxide formed by the inventive method may also be a nonmetallic oxide, such as silicon oxide, in which case the organic compound of the liquid precursor is also nonmetallic. An inventive method involves preparation of a liquid precursor, which is a solution of one or more organic compounds dissolved in a nonaqueous solvent. The precursor is applied to the inner lamp wall surface and treated, usually by one or more heating techniques. As a result, the organic compound or compounds react to form a solid thin film on the inner wall of the lamp having the desired composition. The lamp envelope may be dipped or rolled in liquid precursor to form a liquid coating of precursor, which is then treated. The inventive method also includes a liquid misted deposition method, in which a very fine mist of liquid particles is formed in a carrier gas and deposited on the inner surface of the lamp envelope. The liquid precursor solution may also be applied using a conventional liquid spraying method, as known in the art.

According to the invention, the liquid precursor solution discussed above is applied to the lamp envelope or lamp wall and then a solid metal oxide is formed in heating steps subsequent to the liquid application step. In this regard, the invention has two significant aspects: 1) the liquid is a solution of a metal precursor compound, not a colloidal suspension or dispersion of the material to be deposited; and 2) the liquid solution has a an opportunity to distribute itself on the lamp envelope or lamp wall before a solid is formed. These aspects of the invention may be employed alone or in combination. Both of these aspects contribute to the formation of a continuous, uniform layer of solid on the lamp envelope or wall. Since the liquid is a solution of a metal compound, the distribution of the metal elements is inherently uniform in the liquid. Since the liquid has an opportunity to distribute itself before solidifying, advantage can be taken from the natural tendency of a liquid, as compared to a solid, to distribute itself evenly.

The metal organic liquid precursors utilized in the method of the invention do other salt-forming atoms contained in precursors of the prior art are starting points of measle defects. The invention also provides a measle-inhibiting effect of a U-shaped or other differential resistivity profile of a conductive layer formed in accordance with the invention. A feature of the fabrication method of the invention is an improved technique for forming a U-shaped or other differential resistivity profile in a conductive layer. This is achieved by annealing different portions of the lamp envelope at different temperatures. After the liquid precursor has been deposited on the inner lamp wall surface, the lamp envelope may be annealed in a multi-zone furnace in which the different zones are operated at different temperatures. As a result of the differential heating of the anneal technique, various sections of the conductive layer are "activated" to have different resistivity. Differential heating according to the invention thereby produces a desired differential resistivity profile. The differential heating technique of the invention avoids multi-step techniques of the prior art in which it was necessary to form a conductive layer having varying thickness or material composition in order to achieve a differential resistivity profile.

The method of the invention and the inventive nonaqueous metal organic liquid precursor solutions may be used to manufacture conductive layers in fluorescent lamps using a wide variety of different metal organic precursor compounds to form a wide variety of metal oxide compounds, with or without dopants. The preferred composition of the conductive layer of the invention is a tin-antimony oxide corresponding to the stoichiometric formula $Sn_{0.97}Sb_{0.03}O_2$ with 0.006 mole percent $Nb_2O_5$ dopant. The preferred precursor is a 0.5 molar solution of tin 2-ethylhexanoate and antimony 2-ethylhexanoate in 2-ethylhexanoic acid and n-octane, containing niobium 2-ethylhexanoate, corresponding to the stoichiometric formula $Sn_{0.97}Sb_{0.03}O_2$ with 0.006 mole percent $Nb_2O_5$. In other conductive layers having good properties, the dopants may be $Ta_2O_5$ and $Bi_2O_3$. The composition of the inventive metal organic liquid precursor solutions and oxide layers avoids the generation of measle defects during lamp operation. The resistivity profile in a conductive layer fabricated in accordance with the invention can be determined by selection of liquid precursor composition and treating temperatures. It is understood that the inventive method may be used to fabricate conductive layers having compositions different from the preferred composition described here. Similarly, the inventive composition of precursor may be varied to form metal oxides with a composition different from the preferred composition.

The novel method and novel precursors of the invention may be used advantageously to fabricate metal oxide protective layers, usually comprising a single metal oxide, such as $Y_2O_3$ or $Ce_2O_3$. The inventive method and precursors may also be used to fabricate metal oxide thin film layers besides a conductive layer or a protective layer. For example, the fabrication of some fluorescent lamps may include formation of an electrically nonconductive metal oxide layer on the lamp envelope surface between the envelope wall and a conductive layer.

The method of using metal organic liquid precursors according to the invention allows fine control of the manufacturing process since their composition can be easily controlled and varied, if necessary. They can be safely stored for long periods, up to six months. They are relatively nontoxic and nonvolatile, compared to precursors of the prior art. Metal oxide thin film layers formed in accordance with the invention have smooth, continuous and uniform surfaces, especially compared to oxide layers of the prior art. They can be reliably fabricated to have thicknesses in the range of 20–500 nm, maintaining important characteristics such as transparency and desired electrical properties. Numerous other features, objects and advantages of the invention will become apparent from the following description when read in conjunction with the accompanying drawings.

DETAILED DESCRIPTION OF THE PREFERRED EMBODIMENT

1. Introduction

The term "fluorescent lamp" is used ambiguously in the art. It sometimes means just the tube or "light bulb" portion of a fluorescent lighting device, and it sometimes means the lighting fixture into which the tube or bulb is inserted, and it sometimes means the entire lighting device, including both the tube and the lighting fixture. In keeping with the convention in the technical literature, in this disclosure, "fluorescent lamp" means the tube or bulb which is inserted into a fluorescent lighting fixture. It should be understood that FIGS. 1, 2, 3 and 5 depicting fluorescent lamp structures are not meant to be actual plan or cross-sectional views of any particular portion of an actual fluorescent lamp. In the actual devices, the layers may not be as regular and the thicknesses may have different proportions. The figures instead show idealized representations which are employed only to depict more clearly and fully the methods, compositions and precursors of the invention than would otherwise be possible.

Figure 1:
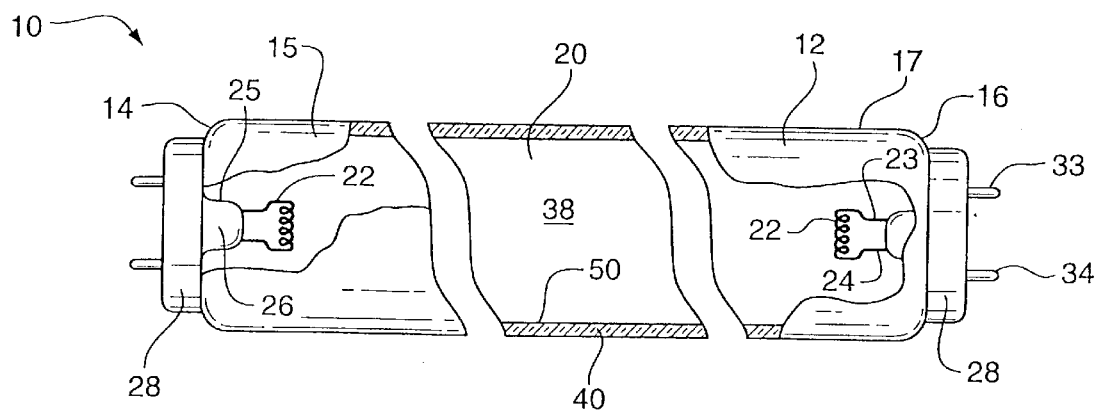
FIG. 1 shows a cross-sectional diagrammatic view of a finished fluorescent lamp 10 fabricated in accordance with a preferred embodiment of the invention.

FIG. 1 shows a cross-sectional diagrammatic view of a finished fluorescent lamp 10 fabricated in accordance with a preferred embodiment of the invention. Fluorescent lamp 10 comprises an elongated, light-transmitting envelope 12. In the embodiment depicted in FIG. 1, envelope 12 is a cylindrical glass tube. Envelope 12 typically comprises conventional soda glass, having a soda lime ($Na_2O$) content of 15 to 25 percent.

Figure 2:
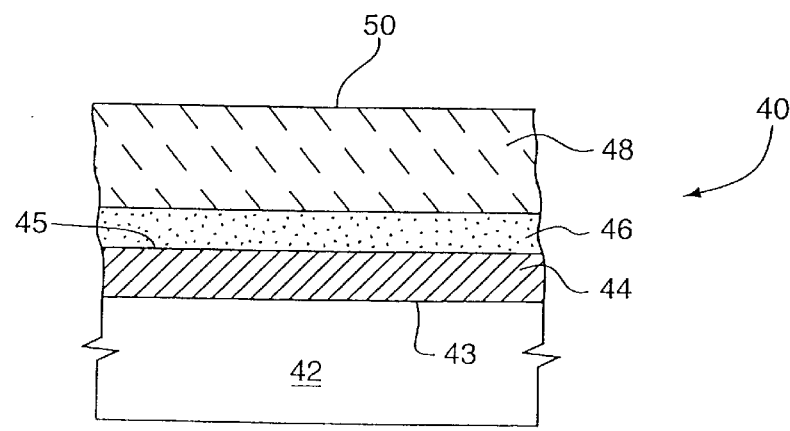
FIG. 2 shows a cross-sectional diagrammatic view of the lamp wall of the fluorescent lamp of FIG. 1.

Fluorescent lamp 10 has a lamp wall 40. As depicted in FIG. 2, lamp wall 40 comprises: an envelope wall 42 of envelope 12, having an inner envelope surface 43; a conductive layer 44; a protective layer 46; and a phosphor layer 48. In FIGS. 1 and 2, inner lamp wall surface 50 is the top surface of phosphor layer 48, contiguous with interior space 38. But in intermediate stages of fabrication not depicted herein, inner lamp wall surface contiguous to interior space 38 and on which another layer may be formed, is the top surface of the uppermost layer existing in a particular stage of fabrication. For example, with reference to FIG. 2, prior to formation of any of the layers 44, 46, and 48, the lamp wall is simply the envelope wall 42, and the inner lamp wall surface is inner envelope surface 43; after formation of conductive layer 44, but before formation of protective layer 46, the inner lamp wall surface is the surface 45 of conductive layer 44. Conductive layer 44, phosphor layer 48 and the other layers included in lamp wall 40 are circumferentially continuous and axially continuous.

Returning to FIG. 1, lamp wall 40 has a first end 14. Associated with first end 14 is a first wall portion 15. Lamp wall 40 also has a second end 16. Associated with second end 16 is a third wall portion 17. A middle or second wall portion 20 is disposed between first wall portion 15 and third wall portion 17. Electrodes 22 are located at ends 14, 16. Electrodes 22 are connected to lead wires 23, 24 which extend through glass seals 25 in mount stems 26 to the electrical contacts of caps 28 disposed at ends 14, 16 of the sealed envelope 12. A pair of contact pins 33, 34 extend from each of caps 28 and are electrically connected to associated leads 23, 24. When sealed, the interior space 38 of lamp 10 contains a known discharge-sustaining gas fill, preferably comprising mercury vapor together with an inert, ionizable gas.

Figure 4:
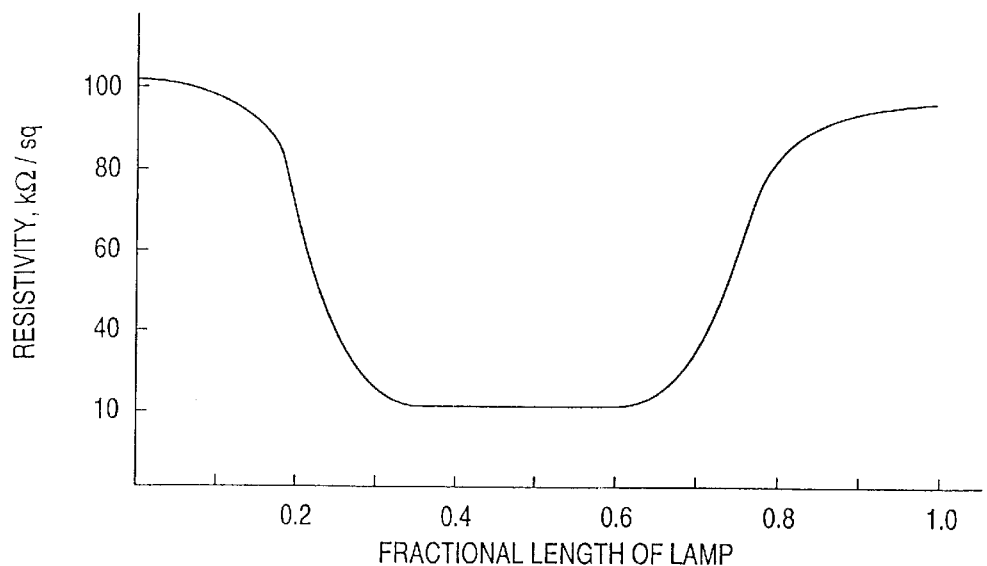
FIG. 4 is a graph of a U-shaped differential resistivity profile in the conductive layer of a fluorescent lamp in accordance with the invention.

Turning again to FIG. 2, conductive layer 44 is formed using a liquid precursor in accordance with the invention. In this preferred embodiment of fluorescent lamp 10, conductive layer 44 is a transparent, electrically conductive metal oxide thin film having the stoichiometric formula $Sn_{1-x}Sb_xO_2$, where $0.001 \leq x \leq 0.3$, combined with a dopant selected from the group consisting of $Nb_2O_5$, $Ta_2O_5$ and $Bi_2O_3$, with a relative molar concentration in the range of 0.001 to 1.0 weight percent. Preferably, conductive layer 44 comprises metal oxide having the stoichiometric formula $Sn_{0.97}Sb_{0.03}O_2$ with 0.006 mole percent $Nb_2O_5$ dopant. Conductive layer 44 has a thickness in the range of 30 to 400 nm, preferably in the range of 60–80 nm. As explained in more detail below, the electrical resistivity of conductive layer 44 depends on the annealing temperature used during formation of conductive layer 44. The resistivity of conductive layer 44 may be uniform along the axial length of envelope 12. In a preferred embodiment, however, the resistivity varies along the axial length of envelope 12 such that the resistivity is high in end wall portions 15, 17, i.e., the first and third wall portions, and low in the middle or second portion 20. Preferably, the electrical resistivity of conductive layer 44 in first and third portions 15, 17 is about 100 kΩ/square. Preferably, the electrical resistivity of conductive layer 44 in middle portion 20 is about 10 kΩ/square. It is not necessary that end portions 15, 17 and middle portion 20 have precise edges or boundaries. End portions 15, 17 typically extend an axial distance equal to about from 10% to about 25% of the total axial length of envelope 12, preferably about 20%. Thus, in a fluorescent lamp having an axial length of 120 cm, end portions 15, 17 preferably are each about 24 cm in length, proximate to ends 14,16. Middle portion 20, therefore, has a length in the range of about 50% to 80%, preferably about 60%, of the total axial length of envelope 12. FIG. 4 is a graph of a U-shaped resistivity profile according to a preferred embodiment of the invention, plotting the fractional length of the lamp versus resistivity in kiloohms per square (kΩ/sq.). As shown, the end portions, each comprising about 20% of the total length of the lamp, have an electrical resistivity of about 100 kΩ/square, and the middle portion has a resistivity of about 10 kΩ/square.

Figure 3:
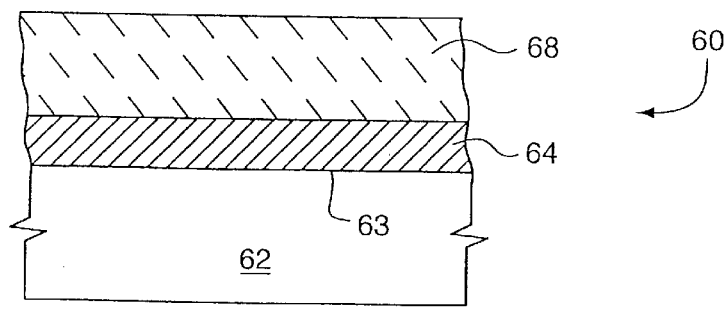
FIG. 3 shows a cross-sectional diagrammatic view of the lamp wall of an alternative embodiment of a fluorescent lamp.

A preferred embodiment of the invention, as depicted in FIG. 2, also includes forming a protective layer 46 on conductive layer 44 using a metal organic liquid precursor solution in accordance with the invention. Preferably, protective layer 46 comprises a metal oxide selected from the group including $Ce_2O_3$, $Y_2O_3$, $Nb_2O_5$, $Ta_2O_5$, $ZrO_2$, $TiO_2$, $HfO_2$, $SiO_2$, $Sb_2O_3$ and $Al_2O_3$. Protective layer 46 has a thickness in the range of 50 to 200 nm, preferably about 100 nm. However, wall 40 of a fluorescent lamp need not be fabricated to contain a protective layer. As depicted in FIG. 3, lamp wall 60 comprises an envelope wall 62 having an inner envelope surface 63 on which is formed a conductive layer 64 in accordance with the invention, and a phosphor layer 68 on conductive layer 64.

Phosphor layers 48, 68 comprise phosphor materials known in the fluorescent lamp art. The phosphors may be deposited using one or more applications of material, and may comprise more than one phosphor as well as known phosphor performance enhancers. Phosphor layers 48, 68 may be formed by any known method suitable for application of phosphor materials over oxide materials disposed on the lamp wall of a fluorescent lamp.

Figure 5:
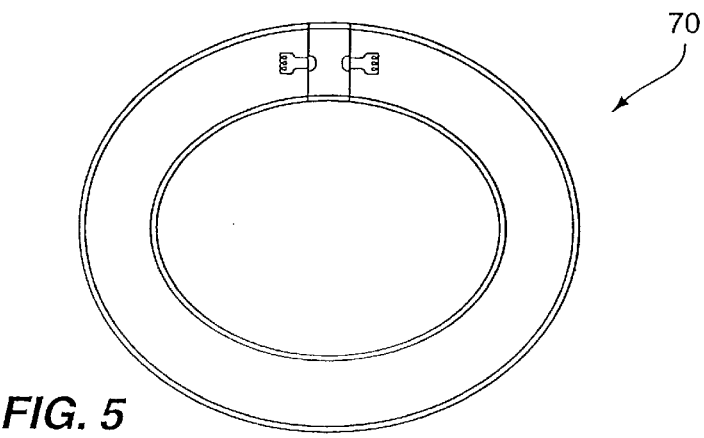
FIG. 5 depicts an alternative shape of a fluorescent lamp.

While the invention is described herein principally with the aid of FIG. 1, in which the fluorescent lamp has the shape of a straight, elongated tube, it is understood that the light transmitting envelope of a fluorescent lamp may have other shapes; for example, a circular lamp 70, as depicted in FIG. 5.

2. Precursor Preparation and Fluorescent Lamp Fabrication Method

The term "thin film" as used herein generally means a film of less than a micron in thickness. The thin films disclosed herein are in all instances less than 1.0 micron in thickness. Typically, the metal oxide thin film layers of the invention have a thickness in the range of from 20 nm to 500 nm, preferably in the range of 50 nm to 200 nm. Thin films formed in accordance with the invention should not be confused with layered structures formed by wholly different processes in which the layers typically have thicknesses exceeding 1.0 micron.

The word "precursor" used herein with reference to the invention can mean a solution containing one metal organic solute that is mixed with other "precursors" to form intermediate precursors or final precursors, or it may refer to a final liquid precursor solution; that is, the solution to be applied to a particular surface during fabrication. In this disclosure, the first type of precursor is usually referred to as an "initial precursor" or designated specifically; for example, a "tin oxide precursor". The precursor as applied to the substrate is usually referred to as the "final liquid precursor", "precursor mixture", or simply "liquid precursor". In any case, the meaning is clear from the context. The composition of a precursor may be described in two ways. The actual dissolved metal organic precursor compounds (solutes) and solvents and concentrations may be specified; or, for the sake of clarity, the stoichiometric formula representing the composition of the final oxide compound to be formed with the precursor may be specified.

The word "solution" is used in this disclosure in its technical sense in which it means a homogenous mixture of two or more substances, retaining its constitution in subdivision to molecular volumes, and displaying no settling. It does not include suspensions of any type, including colloidal suspensions or dispersions, since these mixtures inherently display settling. Thus the phrase "precursor solution" as used in this disclosure means a solution in which an element of the final desired solid material, or a compound of this element, is dissolved in a liquid.

The term "stoichiometric" herein may be applied to both a solid layer of a material or to the liquid precursor for forming a material. When it is applied to a solid layer, it refers to a formula which shows the actual relative amounts of each element in a final solid layer. When applied to a liquid precursor, it usually indicates the molar proportion of metals in the precursor. A "balanced" stoichiometric formula of an oxide as disclosed herein is one in which there is just enough of each element to form a complete crystal structure of the material with all sites of the crystal lattice occupied, though in actual practice there always will be some defects in the crystal at room temperature. For example, $Sn_{0.97}Sb_{0.03}O_2$ is a balanced stoichiometric formula. An important feature of the invention is the presence of a dopant in a conductive metal oxide thin film layer and in the final liquid precursor solution used to form it. A substance is considered to be a dopant if its relative concentration in the precursor or solid layer constitutes less than one percent of the concentration of the major constituents.

Terms of orientation herein, such as "above", "top", "upper", "below", "bottom" and "lower", explained by reference to FIG. 2, mean relative to the envelope wall 42. That is, if a second element is "above" a first element, it means the second element is farther from envelope wall 42; and if it is "below" another element, then it is closer to the envelope wall 42 than the other element. Terms such as "above" and "below" do not, by themselves, signify direct contact. But terms such as "on" or "onto" usually do signify direct contact of a layer with a contiguous layer. The term "directly on" and similar terms always signify direct contact.

Terms such as "heating", "drying", "baking", "rapid thermal process" ("RTP"), "annealing", and others all involve the application of heat. For the sake of clarity, the various terms are used to distinguish certain techniques and method steps from one another. Nevertheless, it is clear that similar techniques may be used to accomplish differently named process steps; for example, drying, baking and annealing may typically be accomplished using the same apparatus, the only differences being their function and position in a fabrication sequence, or the particular temperatures used. As a result, it would be possible to designate an annealing step as a heating step, or a drying step as a baking step. To avoid confusion, therefore, the general term "heating" may also be used to describe a fabrication step, especially in the claims describing the invention. It is further understood that one skilled in the art may accomplish a desired process result using heat as disclosed herein, while referring to the process with a term different from the one used herein.

The long dimension of a fluorescent lamp defines the axial direction. As explained above, not all fluorescent lamps embodying the invention are straight tubes. Flourescent lamps embodying circular tubes are common. Generally, the axial direction is the direction of the path between the two active electrodes of a lamp. The "ends" of a lamp are the portions of the lamp envelope proximate to the electrodes.

The electrical resistivity of a conductive layer as described herein is in the range of from 0.5 to 300 kΩ/square. The term "nonconductive" as used herein to describe a material in a fluorescent lamp signifies that the material being described has an electrical resistivity at least 100 times greater than the highest resistivity of the lamp's conductive layer. It should be understood that the general method and precursors of the invention may be used to fabricate fluorescent lamps having metal oxide thin film layers of varying degrees of resistivity. The invention may also be used to fabricate metal oxide thin film layers in fluorescent lamps in which no conductive layer is present, or in which resistivity is not a functionally important characteristic.

Silicon oxides are often referred to in the art as metal oxides. Therefore, the terms "metal organic precursor compound" and "metal oxide" as used herein include silicon dioxide and silicon-containing precursor compounds of silicon dioxide.

The final precursor applied to an inner lamp wall surface may be a solution of initial precursors. Preferably, each initial precursor contains a metal organic precursor compound for forming a metal oxide. An initial precursor is typically formed by interacting the metal or metals, for example, tin, or an alkoxide of the metal, with a carboxylic acid, or with a carboxylic acid and an alcohol, and dissolving the reactant in a solvent. Carboxylic acids that may be used include 2-ethylhexanoic acid, octanoic acid, and neodecanoic acid, preferably 2-ethylhexanoic acid. Alcohols that may be used include 2-methoxyethanol, 1-butanol, 1-pentanol, 2-pentanol, 1-hexanol, 2-hexanol, 3-hexanol, 2-ethyl-1-butanol, 2-ethoxyethanol, and 2-methyl-1-pentanol, preferably 2-methoxyethanol. Solvents that may be used include xylenes, n-octane, 2-methoxyethanol, n-butyl acetate, n-dimethylformamide, 2-methoxyethyl acetate, methyl isobutyl ketone, methyl isoamyl ketone, isoamyl alcohol, cyclohexanone, 2-ethoxyethanol, 2-methoxyethyl ether, methyl butyl ketone, hexyl alcohol, 2-pentanol, ethyl butyrate, nitroethane, pyrimidine, 1, 3, 5-trioxane, isobutyl isobutyrate, isobutyl propionate, propyl propionate, ethyl lactate, n-butanol, n-pentanol, 3-pentanol, toluene, ethylbenzene, 1-butanol, 1-pentanol, 2-pentanol, 1-hexanol, 2-hexanol, 3-hexanol, 2-ethyl-1-butanol, 2-ethoxyethanol, and 2-methyl-1-pentanol, as well as many others. The metal, metal alkoxide, acid, and alcohol react to form a mixture of metal-alkoxocarboxylate, metal-carboxylate and/or metal-alkoxide, which mixture is heated and stirred as necessary to form metal-oxygen-metal bonds and boil off any low-boiling point organics that are produced by the reaction. Initial precursors are usually made or bought in batches prior to their use; the final precursor mixtures are usually prepared immediately before application to the substrate. Final preparation steps typically include mixing, solvent exchange, and dilution.

Figure 6:
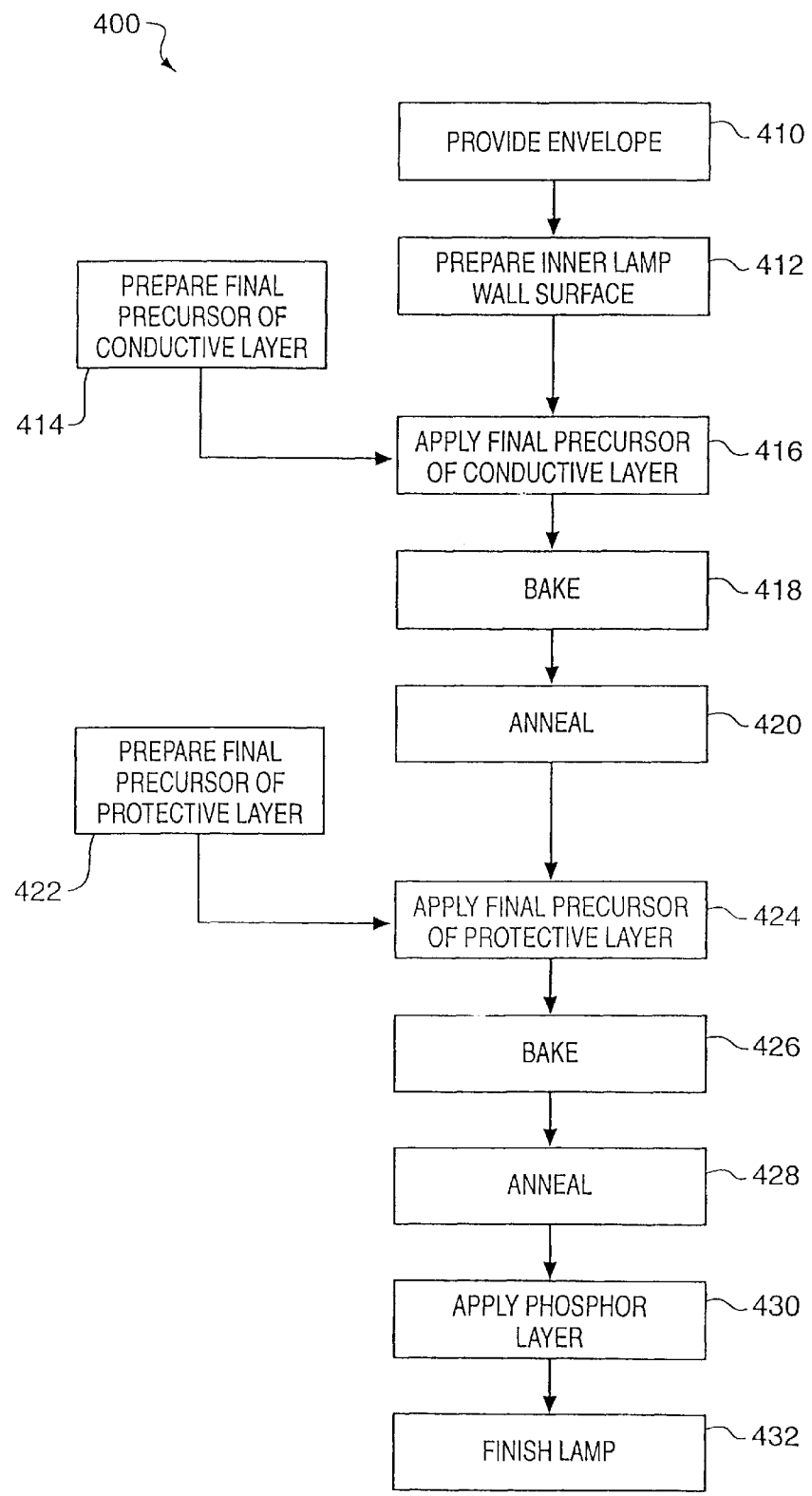
FIG. 6 is a flow chart showing the steps of a generalized liquid source deposition process for fabricating a fluorescent lamp in accordance with an embodiment of the invention.

FIG. 6 is a flow chart showing the steps of a generalized liquid source deposition process 400 for fabricating a fluorescent lamp in accordance with an embodiment of the invention. The fabrication methods, precursors and compositions disclosed herein are discussed in relation to the structure of fluorescent lamp 10, depicted in FIGS. 1 and 2. It is understood, however, that the useful features of the invention can be applied in many variations of the generalized fabrication methods disclosed herein.

In step 410, a conventional fluorescent lamp envelope 12 is provided and in step 412 its inner envelope surface 43 is prepared using conventional techniques of the art. In step 414, a final precursor for forming conductive layer 44 is prepared.

In step 416, the final liquid precursor for the conductive layer is applied to glass inner surface 43 using any deposition process suitable for nonaqueous metal organic liquid precursors. Preferably, a conventional liquid-source spraying method of the fluorescent lamp art is used, except that the liquid is a solution rather than a colloidal suspension. A liquid-source misted deposition process may also be used. In a misted deposition process, a mist comprising fine liquid particles suspended in a carrier gas is flowed through the interior space of the lamp envelope, where the liquid particles deposit on inner envelope surface 43. A misted deposition process has several advantages over a spraying process, including: better control over layer thickness and uniformity; less wasted precursor; continuous operation. Or liquid precursor may be applied by rolling the envelope with liquid precursor in its interior space. In Example 3, described in detail below, a spin-on technique was used to spin the precursor solution on glass wafers. A "cold envelope" or a "hot envelope" applying technique may be used. Preferably, a cold envelope method, sometimes called a cold-tube method, is used. In a typical cold envelope technique, the inner lamp wall surface is not heated, rather it is approximately at room temperature when liquid precursor is applied to it. After application of liquid precursor to form a liquid coating, the envelope is baked, and then annealed. In a typical hot envelope technique, the envelope is heated so that the temperature of the inner lamp wall surface has a value not exceeding 300° C. when the liquid precursor is applied. After application of the precursor, a baking step is not necessary, and the envelope is annealed.

After the liquid precursor is applied in step 416, the lamp envelope is treated to form conductive layer 44. Treating may comprise a process selected from the group including: exposing to vacuum, drying, heating, baking, rapid thermal processing, and annealing. In the preferred method, treatment includes baking and annealing. In step 418, baking serves to remove the organic solvent from wall 40 and causes the metal organic compounds of the precursor to decompose and react. Baking is typically performed for two minutes at 150° C., then at 260° C. for four minutes.

As explained above, in a variation of process 400, the final liquid precursor may be sprayed onto or otherwise applied to the inner lamp wall surface in a lamp envelope that has been heated to a temperature not exceeding 300° C. Upon application, the solvent immediately volatilizes and the organic precursor compound or compounds react, and a baking step 418 is not necessary. The lamp envelope can then be annealed. In another variation of process 400, a liquid-source chemical vapor deposition ("LSCVD") method may be used to apply the liquid precursor by vaporizing either a single final precursor or several liquid precursor solutions in a carrier gas and flowing the vaporized precursor along the heated inner lamp wall surface, where the organic precursor compounds react to form a solid thin film layer, which is then annealed. Here, "vapor" refers to a gasified precursor.

Figure 7:
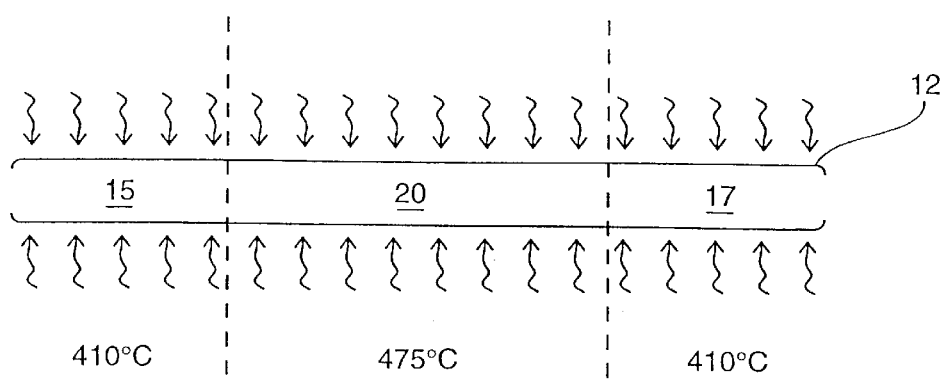
FIG. 7, which follows FIG. 5 in the drawings, is a diagrammatic view of a differential distribution of temperatures during the annealing process according to a preferred embodiment of the invention.

In step 420, a furnace anneal, preferably in a reducing forming-gas atmosphere, results in crystallization or recrystallization of the desired metal oxide compounds in conductive layer 44. The forming gas atmosphere typically contains 5–20 volume percent $H_2$ gas mixed with nitrogen gas. Preferably, the forming gas has a composition of 10% $H_2$ gas and 90% nitrogen. The annealing is conducted at a temperature in the range of from 400° C. to 500° C. The temperature of annealing affects the resistivity of conductive layer 44. The preferred resistivity profile of conductive layer 44 is a U-shaped profile, in which the resistivity in the end portions 15, 17 of wall 40 is about 100 k$\Omega$/square, and the resistivity in middle portion 20 is about 10 k$\Omega$/square. To achieve these approximate values, the partially completed lamp 40 is annealed in a zoned furnace, in which the temperature can be controlled to be different from one zone to the next. When conductive layer 44 comprises material having the preferred composition described above, that is, $Sn_{0.97}Sb_{0.03}O_2$, with 0.006 mole percent $Nb_2O_5$ dopant, then the desired U-shaped profile is achieved by annealing end portions 15, 17 of lamp wall 40 at 410° C., and middle portion 20 at 475° C. Such a distribution of temperatures during the annealing process is depicted in FIG. 7, which follows FIG. 5 in the drawings.

After envelope 12 including conductive layer 44 has been annealed in step 418, the phosphor layer can be applied, as depicted in the embodiment of FIG. 3, in which phosphor layer 68 is formed on conductive layer 64. Nevertheless, the preferred embodiment of the invention includes forming protective layer 46 of FIG. 2. In step 422, a final precursor for protective layer 46 is prepared. A final precursor for protective layer 46 is prepared using reactants, solvents and techniques similar to those used in step 414 for preparing the final precursor of conductive layer 44. Nevertheless, a final precursor for protective layer 46 usually comprises only a single metal organic precursor compound, such as a metal carboxylate, in which the metal is one selected from the group including cerium, yttrium, niobium, tantalum, zirconium, titanium, hafnium, silicon, antimony and aluminum. Typical metal carboxylates are ethylhexanoates, octanoates, and neodecanoates. Preferably, the final precursor prepared in step 422 comprises a 0.20 molar solution of cerium 2-ethylhexanoate in 2-ethylhexanoic acid and n-octane, as described in Example 1, below, for forming $Ce_2O_3$. Another example of a final precursor for protective layer 46 is yttrium 2-ethylhexanoate in 2-ethylhexanoic acid and n-octane for forming $Y_2O_3$.

In step 424, the final liquid precursor for protective layer 46 is applied onto conductive layer 44 using any deposition process suitable for nonaqueous metal organic liquid precursors. Preferably, a cold-envelope technique is used.

After the liquid precursor is applied in step 424, the lamp envelope is treated to form protective layer 46. Treating may comprise a process selected from the group including: exposing to vacuum, drying, heating, baking, rapid thermal processing, and annealing. In the preferred cold-envelope method, treatment includes baking and annealing. In step 426 of the preferred method, baking serves to remove the organic solvent from wall 40 and causes the metal organic compounds of the precursor to decompose and react. Baking is typically performed for one minute at 160° C., then at 260° C. for four minutes. In step 428, a furnace anneal, preferably in a reducing atmosphere, results in formation and crystallization of the desired electrically nonconductive oxide material in protective layer 46. The forming gas atmosphere typically contains 5–20 volume percent $H_2$ gas mixed with nitrogen gas. Preferably, the forming gas has a composition of 10% $H_2$ gas and 90% nitrogen. The annealing is conducted at a temperature in the range of from 400° C. to 500° C.

In step 430, phosphor layer 48 is formed on inner lamp wall surface 50. Phosphor layer 48 is formed using conventional techniques of the art. In step 432, the fluorescent lamp is finished using conventional techniques. Step 432 typically includes inserting electrodes, injecting fill gas, sealing the envelope and mounting end caps.

EXAMPLE 1

A preferred final precursor for a conductive layer is a 0.5 molar solution of tin 2-ethylhexanoate and antimony 2-ethylhexanoate in relative molar proportions corresponding to the stoichiometric formula $Sn_{0.97}Sb_{0.03}O_2$, with 0.006% (mole percent) $Nb_2O_5$ dopant.

A solution of tin 2-ethylhexanoate in 2-ethylhexanoic acid comprising approximately 28 weight percent tin was obtained from Strem Chemicals, Inc. The commercial tin-containing solution was mixed with anhydrous n-octane from Aldrich Company to adjust the concentration to 0.50 molar, filtered through a 0.2 micron filter and bottled.

Antimony n-butoxide was converted to antimony 2-ethylhexanoate. Antimony n-butoxide was obtained from Strem Chemicals, Inc. A 100 ml round-bottom flask was purged with nitrogen. Nine grams of antimony n-butoxide was combined with 3.15 equivalents of 2-ethylhexanoic acid from Aldrich Company and 15 ml anhydrous noctane in the round-bottom flask, which was purged with nitrogen again and closed with a septum stopper. The contents of the flask were stirred with a magnetic stirrer for 24 hours. The solution in the flask was poured into a graduated cylinder and n-octane was added to adjust the concentration to exactly 0.50 molar. The solution was filtered through a 0.2 micron filter and bottled.

Niobium ethoxide was obtained from Strem Chemicals, Inc. A 100 ml round-bottom flask was purged with nitrogen. Six grams of niobium ethoxide was combined with 5.25 equivalents of 2-ethylhexanoic acid and 10 ml xylene from Aldrich Company in the round-bottom flask, which was purged with nitrogen again and connected to a reflux condenser. A slow flow of nitrogen was established into and out of the top of the condenser, and the flask was heated at 100° C. in an oil bath while the contents of the flask were stirred with a magnetic stirrer. After 18 hours, the reflux condenser was removed, a distillation head and a condenser were attached, and the temperature of the oil bath was raised to 120° C. Distillation was conducted to reach a maximum head temperature of 72° C.; distillation was continued until the head temperature decreased to below 50° C. The flask was removed from the heat, the distillation apparatus was disassembled, and the flask was purged again with nitrogen gas while the solution was still hot. The solution in the flask was allowed to cool to room temperature. The cooled solution was poured into a graduated cylinder and xylene was added to adjust the concentration to exactly 0.50 molar (approximately 38 ml). The 0.5 molar solution was filtered through a 0.2 micron filter and bottled. Prior to making the final precursor, 0.1 ml of the niobium 2-ethylhexanoate solution was mixed with 4.9 ml of xylene to make a solution with 0.01 molar concentration.

19.4 ml of the 0.50 molar tin 2-ethylhexanoate solution was mixed with 0.6 ml of the 0.50 molar antimony 2-ethylhexanoate solution to form 20 ml of 0.50 molar liquid precursor containing tin and antimony corresponding to the stoichiometric formula $Sn_{0.97}Sb_{0.03}O_2$. 10 ml of the 0.50 molar tin-antimony solution was mixed with 0.03 ml of the 0.01 molar niobium 2-ethylhexanoate solution to form a final liquid precursor containing metal organic precursor compounds in relative molar proportions corresponding to the stoichiometric formula $Sn_{0.97}Sb_{0.03}O_2$ with 0.006 mole percent $Nb_2O_5$ dopant.

The amounts of reactants and solvents used in Example 1 may be scaled up for commercial fabrication. For reasons related to safety and handling, it is preferable to use n-octane solvent instead of xylenes in commercial-scale processes.

EXAMPLE 2

A preferred final precursor for a protective layer is a 0.20 molar solution of cerium 2-ethylhexanoate in 2-ethylhexanoic acid and n-octane. A solution of cerium 2-ethylhexanoate dissolved in 2-ethylhexanoic acid (approximately 12 wt % Ce) was obtained from Aldrich Company. 23 grams of the cerium 2-ethylhexanoate solution was weighed in a 100 ml graduated cylinder, and anhydrous n-octane, also from Aldrich Company, was added to adjust the concentration to exactly 0.20 molar concentration. A stirring bar was added and the mixture was stirred until homogeneous. The solution was filtered through a 0.2 micron filter and bottled.

EXAMPLE 3

Thin films of tin-antimony oxide doped with niobium were formed on a series of silicon dioxide wafers using an inventive nonaqueous metal organic liquid precursor solution containing metal organic precursor compounds in relative molar proportions corresponding to the stoichiometric formula $Sn_{0.97}Sb_{0.03}O_2$ with 0.006 mole percent $Nb_2O_5$, in accordance with the invention. The resistivity of the thin films was measured.

To make each exemplary conductive layer, a spin-on technique was used. A final precursor was prepared as in Example 1. A few drops of the final precursor were placed on a wafer, which was spun at 3000 rpm for 30 seconds. The wafer was soft baked at 150° C. for two minutes, and hard baked at 260° C. for four minutes. The conductive layer thin film was grown by annealing the wafer at a selected temperature in the range of from 400° C. to 500° C. in forming gas with a composition of 10% $H_2$ gas in nitrogen. The thickness of the exemplary conductive layer thin films was in the range of from 60 to 80 nm. The sheet resistance of the examples was determined with a four-point probe using tungsten contacts. The resistivity of examples annealed at 410° C. was approximately 100 k$\Omega$/square. The resistivity of examples annealed at 475° C. was approximately 10 k$\Omega$/square.

There has been described a novel method for fabricating thin film layers in fluorescent lamps. The novel method uses metal organic decomposition techniques, in which a metal organic liquid precursor solution containing one or more metal organic liquid precursor compounds is applied to the wall of a lamp envelope, where heat causes reaction and the formation of a metal oxide thin film layer. Selective combination of thin film layer composition and annealing temperature allows control of electrical resistivity. The invention further encompasses novel compositions of thin films in fluorescent lamps, in particular, new compositions of the conductive layer. The invention inhibits the generation of "measles", or "black spot defects", in fluorescent lamps, thereby improving their appearance and operating performance. The invention also provides greater efficiency and control in the manufacture of metal oxide thin film layers in fluorescent lamps. It should be understood that the particular embodiments shown in the drawings and described within this specification are for purposes of example and should not be construed to limit the invention, which will be described in the claims below. For example, the invention contemplates that the metal organic liquid precursor solutions of the invention may comprise a wide range of different types of metal organic compounds that can be deposited and decomposed using metal organic decomposition techniques. Similarly, the metal oxide thin films of the fluorescent lamp may comprise materials of various compositions and thicknesses. By selective treatment, thin films formed by the method of the invention may have different electrical properties, even if they have the same chemical composition. It is evident that those skilled in the art may now make numerous uses and modifications of the specific embodiments described, without departing from the inventive concepts. It is also evident that the steps recited may in some instances be performed in a different order; or equivalent structures and processes may be substituted for the structures and processes described. Consequently, the invention is to be construed as embracing each and every novel feature and novel combination of features present in and/or possessed by the fabrication processes, compositions, and lamp manufacturing methods described.

What is claimed is:

1. A method of fabricating a fluorescent lamp comprising:
   providing a partially fabricated lamp having a lamp envelope and a lamp wall;
   providing a liquid precursor solution comprising a metal organic compound;
   applying said liquid precursor solution to said lamp wall to form a metal oxide thin film containing said metal; and
   completing the fabrication of said lamp to include said metal oxide thin film as a part of said lamp wall,
   characterized in that said metal organic compound is selected from the group consisting of alkoxycarboxylates, alkoxides, ethylhexanoates, octanoates, and neodecanoates.

2. A method of fabricating a fluorescent lamp as in claim 1, wherein said metal organic compound comprises a metal ethylhexanoate.

3. A method of fabricating a fluorescent lamp as in claim 2, wherein said metal organic compound comprises tin 2-ethylhexanoate.

4. A method of fabricating a fluorescent lamp as in claim 3, wherein said metal organic compound further comprises antimony 2-ethylhexanoate.

5. A method as in claim 1, wherein said liquid precursor solution further comprises a solvent and said solvent is selected from the group consisting of alcohols, aromatic hydrocarbons, and esters.

6. A method as in claim 5, wherein said solvent is selected from the group consisting of xylenes, n-octane, 2-methoxyethanol, n-butyl acetate, 1,4-dioxane, methanol and methyl ethyl ketone.

7. A method of fabricating a fluorescent lamp as in claim 1, wherein said precursor solution contains metal moieties in effective amounts for forming said metal oxide having a stoichiometric formula $Sn_{1-x}Sb_xO_2$, where $0.001 \leq x \leq 0.3$, combined with a dopant selected from the group consisting of $Nb_2O_5$, $Ta_2O_5$ and $Bi_2O_5$, with a relative molar concentration in the range of 0.001 to 1.0 mole percent.

8. A method of fabricating a fluorescent lamp as in claim 7, wherein said liquid precursor solution contains metal moieties in effective amounts for forming said metal oxide having a stoichiometric formula $Sn_{0.97}Sb_{0.03}O_2$ with 0.006 mole percent $Nb_2O_5$ dopant.

9. A method of fabricating a fluorescent lamp as in claim 1, wherein said metal organic compound comprises a metal selected from the group consisting of cerium, yttrium, niobium, tantalum, zirconium, titanium, hafnium, silicon, antimony and aluminum.

10. A method of fabricating a fluorescent lamp as in claim 1, wherein said liquid precursor solution contains metal moieties in effective amounts for forming an oxide selected from the group consisting of $CeO_2$, $Y_2O_3$, $NbO_2$, $TaO_2$, $ZrO_2$, $TiO_2$, $HfO_2$, $SiO_2$, $Sb_2O_3$ and $Al_2O_3$.

11. A method of fabricating a fluorescent lamp as in claim 1, wherein said metal oxide thin film is conductive.

12. A method of fabricating a fluorescent lamp as in claim 1, wherein said metal comprises tin.

13. A method of fabricating a fluorescent lamp as in claim 12, wherein said metal further comprises antimony.

14. A method of fabricating a fluorescent lamp as in claim 1, wherein said lamp wall comprises a conductive layer and said liquid precursor solution is applied onto said conductive layer.

15. A method of fabricating a fluorescent lamp as in claim 14, wherein said metal oxide thin film is a protective layer.

16. A method of fabricating a fluorescent lamp as in claim 1, wherein said liquid precursor solution comprises silicon and said metal oxide comprises a silicon oxide.

17. A method of fabricating a fluorescent lamp as in claim 1, wherein said step of applying comprises rolling said envelope in said liquid precursor solution.

18. A method of fabricating a fluorescent lamp as in claim 1, wherein said step of applying comprises a step selected from the group consisting of spraying and chemical vapor deposition.

19. A method of fabricating a fluorescent lamp as in claim 1, further comprising step of heating said envelope before said step of applying.

20. A method of fabricating a fluorescent lamp as in claim 19, wherein said step of heating comprises heating to a temperature not exceeding 300° C.

21. A method of fabricating a fluorescent lamp as in claim 1, wherein said step of applying comprises forming a liquid coating on said lamp wall and treating said liquid coating to form said metal oxide thin film, and wherein said step of treating comprises baking.

22. A method of fabricating a fluorescent lamp as in claim 21, wherein said baking comprises baking at a temperature not exceeding 300° C.

23. A method of fabricating a fluorescent lamp as in claim 22, wherein said step of baking comprises baking at a temperature from 100° C. to 200° C. for a time from one minute to three minutes and then baking at a temperature of from 200° C. to 300° C. for a time from three minutes to five minutes.

24. A method of fabricating a fluorescent lamp as in claim 23, wherein said step of baking comprises baking said envelope at 150° C. for two minutes and then baking said envelope at 260° C. for four minutes.

25. A method of fabricating a fluorescent lamp as in claim 1, wherein said step of applying comprises annealing.

26. A method of fabricating a fluorescent lamp as in claim 25, wherein said step of annealing comprises annealing in a reduction atmosphere at a temperature of from 300° C. to 600° C.

27. A method of fabricating a fluorescent lamp as in claim 26, wherein said annealing comprises annealing in a reduction atmosphere at a temperature of from 400° C. to 500° C. for a time period of from 2 minutes to 15 minutes.

28. A method of fabricating a fluorescent lamp as in claim 26, wherein said lamp comprises an end portion and a middle portion and said step of annealing comprises annealing said end portion at a different temperature than said middle portion.

29. A method of fabricating a fluorescent lamp as in claim 28, wherein said annealing comprises annealing in a multi-zone furnace such that said end portion and said middle portion are annealed simultaneously.

30. A method of fabricating a fluorescent lamp as in claim 28, wherein said end portion is annealed at a lower temperature than said middle portion.

31. A method of fabricating a fluorescent lamp as in claim 30, wherein said end portion is annealed at from 380° C. to 440° C. and said middle portion is annealed at from 450° C. to 500° C.

32. A method of fabricating a fluorescent lamp as in claim 31, wherein said end portion is annealed at 410° C. for five minutes and said middle portion is annealed at 475° C. for five minutes.

33. A method of fabricating a fluorescent lamp as in claim 1, wherein said lamp comprises an end portion and a middle portion and said metal oxide thin film is a conductive film having a different electrical resistivity at said end portion than at said middle portion.

34. A method of fabricating a fluorescent lamp as in claim 33, wherein said electrical resistivity is higher at said end portion than at said middle portion.

35. A method of fabricating a fluorescent lamp as in claim 36, wherein said electrical resistivity is about 100 kΩ/square at said end portion and about 10 kΩ/square at said middle portion.

36. A method of fabricating a fluorescent lamp as in claim 1, wherein said metal oxide thin film has a thickness in the range of 20 nm to 500 nm.

37. A method of fabricating a fluorescent lamp as in claim 36, wherein said metal oxide thin film has a thickness in the range of 60 nm to 80 nm.

38. A method of fabricating a fluorescent lamp comprising:

providing a partially fabricated lamp having a lamp envelope and a lamp wall;

providing a liquid precursor solution containing an organic compound including a metal;

forming a mist of said liquid precursor solution, said mist comprising particles of said precursor solution suspended in a carrier gas;

depositing said mist onto said lamp wall to form a liquid coating;

treating said liquid coating to form a metal oxide thin film containing said metal; and completing the fabrication of said lamp to include said metal oxide thin film as a part of said lamp wall.

39. A method of fabricating a fluorescent lamp as in claim 38, wherein said organic compound is selected from the group consisting of ethylhexanoates, octanoates, and neodecanoates.

40. A method of fabricating a fluorescent lamp as in claim 39, wherein said organic compound comprises a metal ethylhexanoate.

41. A method of fabricating a fluorescent lamp as in claim 40, wherein said organic compound comprises a metal 2-ethylhexanoate.

42. A method as in claim 38, wherein said liquid precursor solution further comprises a solvent and said solvent is selected from the group consisting of alcohols, aromatic hydrocarbons, and esters.

43. A method as in claim 42, wherein said solvent is selected from the group consisting of xylenes, n-octane, 2-methoxyethanol, n-butyl acetate, 1,4-dioxane, methanol and methyl ethyl ketone.

44. A method of fabricating a fluorescent lamp as in claim 38, wherein said metal oxide thin film is a conductor.

45. A method of fabricating a fluorescent lamp as in claim 38, wherein said metal oxide thin film is a protective material.

46. A method of fabricating a fluorescent lamp as in claim 38, wherein said metal comprises tin.

47. A method of fabricating a fluorescent lamp as in claim 38, wherein said metal comprises antimony.

48. A method of fabricating a fluorescent lamp as in claim 38, wherein said precursor solution contains metal moieties in effective amounts for forming said metal oxide having a stoichiometric formula $Sn_{1-x}Sb_xO_2$, where $0.001 \leq x \leq 0.3$, combined with a dopant selected from the group consisting of $Nb_2O_5$, $Ta_2O_5$ and $Bi_2O_5$, with a relative molar concentration in the range of 0.001 to 1.0 mole percent.

49. A method of fabricating a fluorescent lamp as in claim 38, wherein said liquid precursor solution contains metal moieties in effective amounts for forming said metal oxide having a stoichiometric formula $Sn_{0.97}Sb_{0.03}O_2$ with 0.006 mole percent $Nb_2O_5$ dopant.

50. A method of fabricating a fluorescent lamp as in claim 38, wherein said metal comprises a metal selected from the group consisting of cerium, yttrium, niobium, tantalum, zirconium, titanium, hafnium, silicon, antimony and aluminum.

51. A method of fabricating a fluorescent lamp as in claim 50, wherein said metal compound contains metal moieties in effective amounts for forming an oxide selected from the group consisting of $CeO_2$, $Y_2O_3$, $NbO_2$, $TaO_2$, $ZrO_2$, $TiO_2$, $HfO_2$, $SiO_2$, $Sb_2O_3$ and $Al_2O_3$.

52. A method of fabricating a fluorescent lamp having a solid thin film with a differential electrical resistivity profile, said method comprising:

providing a partially fabricated fluorescent lamp including a lamp wall having first lamp wall portion and a second lamp wall portion;

forming a thin film on said first and second lamp wall portions; and annealing said thin film on said first lamp wall portion at a first temperature and annealing said thin film on said second lamp wall portion at a second temperature different than said first temperature to form said solid thin film having said differential electrical resistivity profile.

53. A method of fabricating a fluorescent lamp as in claim 52 wherein said first lamp wall portion is an end portion of said lamp wall and said second lamp wall portion is a middle portion of said lamp wall.

54. A method of fabricating a fluorescent lamp as in claim 53, wherein said end portion is annealed at a lower temperature than said middle portion.

55. A method of fabricating a fluorescent lamp as in claim 54, wherein said end portion is annealed at from 380° C. to 440° C. and said middle portion is annealed at from 450° C. to 500° C.

56. A method of fabricating a fluorescent lamp as in claim 55, wherein said end portion is annealed at 410° C. for five minutes and said middle portion is annealed at 475° C. for five minutes.

57. A method of fabricating a fluorescent lamp as in claim 52, wherein said solid thin film comprises tin.

58. A method of fabricating a fluorescent lamp as in claim 57, wherein said solid thin film further comprises antimony.

59. A method of fabricating a fluorescent lamp as in claim 58 wherein said solid thin film comprises $Sn_{1-x}Sb_xO_2$, where $0.001 \leq x \leq 0.3$, combined with a dopant selected from the group consisting of $Nb_2O_5$, $Ta_2O_5$ and $Bi_2O_5$, with a relative molar concentration in the range of 0.001 to 1.0 mole percent.

60. A method of fabricating a fluorescent lamp as in claim 59 wherein said solid thin film comprises $Sn_{0.97}Sb_{0.03}O_2$ with 0.006 mole percent $Nb_2O_5$ dopant.

61. A method of fabricating a fluorescent lamp as in claim 59 wherein said annealing step comprises annealing in a multi-zone furnace such that said first wall portion and said second wall portion are annealed simultaneously.

62. A method of fabricating a fluorescent lamp comprising:

providing a partially fabricated lamp having a lamp envelope and a lamp wall;

providing a liquid precursor solution comprising a metal compound;

applying said liquid precursor solution to said lamp wall to form a liquid coating;

treating said liquid coating to form a metal oxide thin film containing said metal; and completing the fabrication of said lamp to include said metal oxide thin film as a part of said lamp wall, characterized in that said step of treating comprises baking at a temperature from 100° C. to 200° C. for a time from one minute to three minutes and then baking at a temperature of from 200° C. to 300° C. for a time from three minutes to five minutes.

63. A method of fabricating a fluorescent lamp as in claim 62, wherein said step of baking comprises baking said envelope at 150° C. for two minutes and then baking said envelope at 260° C. for four minutes.

64. A method of fabricating a fluorescent lamp comprising:

providing a partially fabricated lamp having a lamp envelope and a lamp wall;

providing a liquid precursor solution comprising a metal compound;

applying said liquid precursor solution to said lamp wall to form a liquid coating;

treating said liquid coating to form a metal oxide thin film containing said metal; and completing the fabrication of said lamp to include said metal oxide thin film as a part of said lamp wall, characterized in that said step of treating comprises annealing in a reduction atmosphere at a temperature of from 300° C. to 600° C.

65. A method of fabricating a fluorescent lamp as in claim 64, wherein said annealing comprises annealing in a reduction atmosphere at a temperature of from 400° C. to 500° C. for a time period of from two minutes to fifteen minutes.

66. A method of fabricating a fluorescent lamp as in claim 64, wherein said lamp comprises an end portion and a middle portion and said step of annealing comprises annealing said end portion at a different temperature than said middle portion.

67. A method of fabricating a fluorescent lamp as in claim 66, wherein said annealing comprises annealing in a multi-zone furnace such that said end portion and said middle portion are annealed simultaneously.

68. A method of fabricating a fluorescent lamp as in claim 66, wherein said end portion is annealed at a lower temperature than said middle portion.

69. A method of fabricating a fluorescent lamp as in claim 68, wherein said end portion is annealed at from 380° C. to 440° C. and said middle portion is annealed at from 450° C. to 500° C.

70. A method of fabricating a fluorescent lamp as in claim 69, wherein said end portion is annealed at 410° C. for five minutes and said middle portion is annealed at 475° C. for five minutes.

71. A method of fabricating a fluorescent lamp as in claim 66, wherein said lamp comprises an end portion and a middle portion, and said metal oxide thin film is a conductive film having a different electrical resistivity at said end portion than at said middle portion.

72. A method of fabricating a fluorescent lamp as in claim 71, wherein said electrical resistivity is higher at said end portion than at said middle portion.

73. A method of fabricating a fluorescent lamp as in claim 72, wherein said electrical resistivity is about 100 kΩ/square at said end portion and about 10 kΩ/square at said middle portion.

74. A method of fabricating a fluorescent lamp comprising:
providing a partially fabricated lamp having a lamp envelope and a lamp wall;
providing a liquid precursor solution comprising a tin compound;
applying said liquid precursor solution to said lamp wall to form a liquid coating;
treating said liquid coating to form a tin oxide thin film; and
completing the fabrication of said lamp to include said tin oxide thin film as a part of said lamp wall.

75. A method as in claim 74, wherein said metal compound is a metal organic compound not containing chlorine or other highly electronegative salt-forming atoms.

76. A method as in claim 74, wherein said metal organic compound is selected from the group consisting of alkoxycarboxylates, carboxylates and alkoxides.

77. A method as in claim 76, wherein said metal organic compound is selected from the group consisting of ethylhexanoates, octanoates, and neodecanoates.

78. A method as in claim 77, wherein said metal organic compound comprises a metal ethylhexanoate.

79. A method as in claim 78, wherein said metal organic compound comprises tin 2-ethylhexanoate.

80. A method as in claim 79, wherein said metal organic compound further comprises antimony 2-ethylhexanoate.

81. A method as in claim 74, wherein said liquid precursor solution further comprises a solvent and said solvent is selected from the group consisting of alcohols, aromatic hydrocarbons, and esters.

82. A method as in claim 74, wherein said solvent is selected from the group consisting of xylenes, n-octane, 2-methoxyethanol, n-butyl acetate, 1,4-dioxane, methanol and methyl ethyl ketone.

83. A method of fabricating a fluorescent lamp as in claim 74, wherein said conductive layer further comprises antimony.

84. A method as in claim 83, wherein said liquid precursor solution contains metal moieties in effective amounts for forming said metal oxide having a stoichiometric formula $Sn_{0.97}Sb_{0.03}O_2$ with 0.006 mole percent $Nb_2O_5$ dopant.

85. A method as in claim 76, wherein said precursor solution contains metal moieties in effective amounts for forming said metal oxide having a stoichiometric formula $Sn_{1-x}Sb_xO_2$, where $0.001 \leq x \leq 0.3$, combined with a dopant selected from the group consisting of $Nb_2O_5$, $Ta_2O_5$ and $Bi_2O_5$, with a relative molar concentration in the range of from 0.001 mole percent to 1.0 mole percent.

86. A method of fabricating a fluorescent lamp as in claim 74, wherein said step of applying comprises misted deposition.

87. A method of fabricating a fluorescent lamp comprising:
providing a partially fabricated lamp having a lamp envelope and a lamp wall;
providing a liquid precursor solution containing an organic compound including a metal;
utilizing said liquid precursor solution to form a solid metal oxide thin film including said metal on said lamp wall; and
completing the fabrication of said lamp to include said metal oxide thin film as a part of said lamp wall,
characterized in that said metal oxide thin film is a conductive layer containing tin and said metal compound is a metal organic compound not containing chlorine or other highly electronegative salt-forming atoms.

88. A method as in claim 87, wherein said metal organic compound is selected from the group consisting of alkoxycarboxylates, carboxylates and alkoxides.

89. A method as in claim 88, wherein said metal organic compound is selected from the group consisting of ethylhexanoates, octanoates, and neodecanoates.

90. A method as in claim 87, wherein said precursor solution contains metal moieties in effective amounts for forming said metal oxide having a stoichiometric formula $Sn_{1-x}Sb_xO_2$, where $0.001 \leq x \leq 0.3$, combined with a dopant selected from the group consisting of $Nb_2O_5$, $Ta_2O_5$ and $Bi_2O_5$, with a relative molar concentration in the range of from 0.001 mole percent to 1.0 mole percent.

91. A method of fabricating a fluorescent lamp comprising:
providing a partially fabricated lamp having a lamp envelope and a lamp wall;
providing a liquid precursor solution comprising a metal compound, wherein said precursor solution contains metal moieties in effective amounts for forming a metal oxide having a stoichiometric formula $Sn_{1-x}Sb_xO_2$, where $0.001 \leq x \leq 0.3$, combined with a dopant selected from the group consisting of $Nb_2O_5$, $Ta_2O_5$ and $Bi_2O_5$, with a relative molar concentration in the range of from 0.001 mole percent to 1.0 mole percent;
applying said liquid precursor solution to said lamp wall to form a thin film of said metal oxide; and
completing the fabrication of said lamp to include said metal oxide thin film as a part of said lamp wall.

92. A method as in claim 91, wherein said liquid precursor solution contains metal moieties in effective amounts for forming said metal oxide having a stoichiometric formula $Sn_{0.97}Sb_{0.03}O_2$ with 0.006 mole percent $Nb_2O_5$ dopant.

* * * * *